United States Patent [19]

Garahi

[11] Patent Number: 5,396,228
[45] Date of Patent: Mar. 7, 1995

[54] METHODS AND APPARATUS FOR COMPRESSING AND DECOMPRESSING PAGING DATA
[75] Inventor: Masood Garahi, Madison, Miss.
[73] Assignee: Mobile Telecommunications Technologies, Jackson, Miss.
[21] Appl. No.: 821,454
[22] Filed: Jan. 16, 1992
[51] Int. Cl.6 .......................... H04Q 7/00; G08B 5/22
[52] U.S. Cl. .............................. 340/825.44; 340/311.1; 341/106; 380/42
[58] Field of Search ..................... 341/173, 178, 106; 380/42, 43; 379/56, 57; 375/122; 371/2.1, 2.2; 340/825.44, 311.1

[56] References Cited

U.S. PATENT DOCUMENTS

| | | | |
|---|---|---|---|
| 3,914,586 | 10/1975 | McIntosh | 235/154 |
| 3,976,844 | 8/1976 | Betz | 179/15.55 R |
| 4,021,782 | 3/1977 | Hoerning | 340/172.5 |
| 4,054,951 | 10/1977 | Jackson et al. | 364/900 |
| 4,087,788 | 5/1978 | Johannesson | 340/146.3 |
| 4,286,256 | 8/1981 | Langdon, Jr. et al. | 340/347 DD |
| 4,295,125 | 10/1981 | Langdon, Jr. | 340/347 DD |
| 4,336,524 | 6/1982 | Levine | 340/311.1 |
| 4,382,256 | 5/1983 | Nagata | 340/825.44 |
| 4,412,306 | 10/1983 | Moll | 364/900 |
| 4,463,342 | 7/1984 | Langdon, Jr. et al. | 340/347 DD |
| 4,464,650 | 8/1984 | Eastman et al. | 340/347 DD |
| 4,467,317 | 8/1984 | Langdon, Jr. et al. | 340/347 DD |
| 4,491,934 | 1/1985 | Heinz | 364/900 |
| 4,494,108 | 1/1985 | Langdon, Jr. | 340/347 DD |
| 4,558,302 | 12/1985 | Welch | 340/347 DD |
| 4,560,976 | 12/1985 | Finn | 340/347 DD |
| 4,586,027 | 4/1986 | Tsukiyama et al. | 340/347 DD |
| 4,597,057 | 6/1986 | Snow | 364/900 |
| 4,612,532 | 9/1986 | Bacon et al. | 340/347 DD |
| 4,622,545 | 11/1986 | Atkinson | 340/747 |
| 4,633,490 | 12/1986 | Goertzel et al. | 375/122 |
| 4,652,856 | 3/1987 | Mohiuddin et al. | 340/347 DD |
| 4,682,150 | 7/1987 | Mathes et al. | 340/347 DD |
| 4,696,054 | 9/1987 | Tsugei et al. | 455/89 |
| 4,701,745 | 10/1987 | Waterworth | 340/347 DD |
| 4,713,808 | 12/1987 | Gaskill et al. | 370/94.1 |
| 4,730,348 | 3/1988 | MacCrisken | 375/122 |
| 4,758,899 | 7/1988 | Tsukiyama | 360/8 |
| 4,809,350 | 2/1989 | Shimoni et al. | 382/56 |
| 4,814,746 | 3/1989 | Miller et al. | 341/95 |
| 4,853,696 | 8/1989 | Mukherjee | 340/337 DD |
| 4,870,402 | 9/1989 | Deluca et al. | 340/825.44 |
| 4,872,009 | 10/1989 | Tsukiyama et al. | 341/95 |
| 4,876,541 | 10/1989 | Storer | 341/51 |
| 4,891,643 | 1/1990 | Mitchell et al. | 340/347 DD |
| 4,905,297 | 2/1990 | Langdon, Jr. et al. | 382/56 |
| 4,906,991 | 3/1990 | Fiala et al. | 341/51 |
| 4,935,882 | 6/1990 | Pennebaker et al. | 364/354 |
| 4,941,193 | 7/1990 | Barnsley et al. | 382/56 |
| 4,943,869 | 7/1990 | Horikawa et al. | 358/426 |
| 4,955,066 | 9/1990 | Notenboom | 382/56 |
| 4,962,377 | 10/1990 | Wallace et al. | 340/825.44 |
| 4,973,961 | 11/1990 | Chamzas et al. | 341/51 |
| 4,988,998 | 1/1991 | O'Brien | 341/55 |
| 5,001,478 | 3/1991 | Nagy | 341/67 |
| 5,003,307 | 3/1991 | Whiting et al. | 341/51 |
| 5,016,009 | 5/1991 | Whiting et al. | 341/67 |
| 5,023,611 | 6/1991 | Chamzas et al. | 341/51 |
| 5,025,258 | 6/1991 | Duttweiler | 341/107 |
| 5,049,881 | 9/1991 | Gibson et al. | 341/95 |
| 5,051,745 | 9/1991 | Katz | 341/51 |
| 5,065,447 | 11/1991 | Barnsley et al. | 382/56 |
| 5,109,433 | 4/1992 | Notenboom | 382/40 |
| 5,126,739 | 6/1992 | Whiting et al. | 341/106 |
| 5,140,321 | 8/1992 | Jung | 341/35 |
| 5,155,484 | 10/1992 | Chambers, IV | 341/55 |
| 5,179,378 | 1/1993 | Ranganathan et al. | 341/51 |

FOREIGN PATENT DOCUMENTS 2-046275  2/1990  Japan ................. A23L 3/26

Primary Examiner—Donald J. Yusko
Assistant Examiner—Edward Merz
Attorney, Agent, or Firm—Finnegan, Henderson, Farabow, Garrett & Dunner

[57] ABSTRACT

A system and method for encoding and decoding page messages includes an encoder for encoding and classifying each word of the page message. Words found in one of one or more word dictionaries are encoded into corresponding compressed codes. A header code identifying either the dictionary or the classification of the word is associated with each word. The encoded message is transmitted to a page receiver where each word is decoded based upon the header code associated therewith. If the header code indicates that the word is a compressed code stored in a word dictionary, the compressed code is used to retrieve the word from the dictionary. If the header code indicates that the word is not stored in a word dictionary, the words are decoded differently, depending upon their classification.

24 Claims, 9 Drawing Sheets

| | | | | | | | | | | |
|---|---|---|---|---|---|---|---|---|---|---|
| P | l | e | a | s | e | sp | c | a | l | l |
| 01010000 | 01101100 | 01100101 | 01100001 | 01110011 | 01100101 | 00100000 | 01100011 | 01100001 | 01101100 | 01101100 |
| sp | M | r | . | sp | J | o | n | e | s | sp |
| 00100000 | 01001101 | 01110010 | 00101110 | 00100000 | 01001010 | 01101111 | 01101110 | 01100101 | 01110011 | 00100000 |
| a | t | sp | 5 | 0 | 1 | - | 5 | 5 | 5 | - |
| 01100001 | 01110100 | 00100000 | 00110101 | 00110000 | 00110001 | 00101101 | 00110101 | 00110101 | 00110101 | 00101101 |
| 1 | 2 | 3 | 4 | sp | r | e | g | a | r | d |
| 00110001 | 00110010 | 00110011 | 00110100 | 00100000 | 00110010 | 01100101 | 01100111 | 01100001 | 01110010 | 01100100 |
| i | n | g | sp | i | n | v | o | i | c | e |
| 01101001 | 01101110 | 01110001 | 00100000 | 01101001 | 01101110 | 01110110 | 01101111 | 01101001 | 01100011 | 01100101 |
| sp | n | u | m | b | e | r | sp | 5 | 6 | 7 |
| 00100000 | 01101110 | 01110101 | 01101101 | 01100010 | 01100101 | 00110010 | 00100000 | 00110101 | 00110110 | 00110111 |
| 8 | 9 | | | | | | | | | |
| 00111000 | 00111001 | | | | | | | | | |

FIG. 2
PRIOR ART

| HEADER CODE | DICTIONARY OR CLASS |
|---|---|
| 0 | INDEX TO COMMON WORD DICTIONARY |
| 1 | INDEX TO LESS COMMON WORD DICTIONARY |
| 010 | NEXT 7-BITS=CHARACTER OF LITERAL WORD |
| 011 | NEXT 24-BITS= 7 DIGIT TELEPHONE NO. |
| 100 | NEXT 34-BITS= 10 DIGIT TELEPHONE NO. |
| 101 | NEXT 16-BITS= INTEGER VALUE < PREDETERMINED MAX. |

FIG. 4

METHODS AND APPARATUS FOR COMPRESSING AND DECOMPRESSING PAGING DATA

BACKGROUND OF THE INVENTION

1. Field of the Invention

The present invention relates to data compression/decompression techniques for data transmitted in a telecommunication system, and in particular, to data compression/decompression techniques for data transmitted in a paging system.

2. Description of the Related Art

Paging systems can now send alphanumeric messages to subscribers virtually anywhere in the world. To page a subscriber, a caller need not know the subscriber's location. The caller simply calls a paging system control terminal and provides the personal identification number (PIN) of the subscriber and an alphanumeric message, typically including the caller's telephone number and/or a brief message. The paging system control terminal transmits the message to one or more geographic regions.

Conventional data transmission techniques used in conventional paging systems require that each message be transmitted in accordance with a predetermined protocol. One example of such a protocol is the Telocator Network Paging Protocol (TNPP), which is an open data communication protocol used to transfer paging information from a paging system control terminal to a transmitting device.

FIG. 1 illustrates the TNPP protocol 100 in block format. The TNPP protocol 100 includes start of header flag 102, header section 104, header extension section 106, start of text flag 108, data block or blocks 110, end flag 112, and block check code section 114. These flags and sections format the necessary header and identification information and provide for the page message in the data block or blocks 110. The present invention relates to the compression of data for data block of block 110. At a paging transmitter, the TNPP protocol is reconfigured into a paging protocol for transmission to one or more page receivers.

Traditionally, page messages are transmitted using either an ASCII transmission format or a preestablished phrase technique. An example of a page message to be transmitted is: "Please call Mr. Jones at 501-555-1234 regarding invoice number 56789." FIG. 2 illustrates an ASCII transmission format necessary to transmit this exemplary message. Each character, punctuation mark, and space (sp) of this message requires eight (8)-bits of binary information to be transmitted. As a result, even this simple message comprises a significant string of binary data (specifically 544 bits), which increases the operating costs of the corresponding paging system. This increased cost is ultimately borne by the subscriber to the paging service.

One conventional technique for reducing the amount of information to be transmitted for a page message is the preestablished phrase technique, wherein predetermined codes are assigned to preestablished phrases to reduce the amount of data to be transmitted. For example, the phrase "Please call the office" may be associated with a sixteen (16)-bit code which is transmitted to the page receiver. Although this technique has the advantage of reducing data to be transmitted for some messages, it is inherently limited in that only preestablished phrases can be codified and transmitted. If the message to be transmitted is not a preestablished phrase, then the complete ASCII representation of the message must be transmitted. Thus, while the preestablished phrase technique has some advantages, it is inherently limited and inflexible and does not provide an accommodating solution to the problem of data transmission for unique page messages.

SUMMARY OF THE INVENTION

Accordingly, it is an object of this invention to provide a data compression/decompression technique that reduces the amount of data necessary to transmit a page message.

It is another object of this invention to provide a data compression/decompression technique for paging systems that is more flexible than conventional techniques.

To accomplish this and other objects, and in accordance with the purposes of the invention as embodied and broadly described herein, the present invention provides a method and apparatus for encoding and decoding page messages to be transmitted in a paging system. The methods and apparatuses of the present invention are particularly advantageous in that they reduce the cost of transmitting page messages compared to conventional data transmission techniques and apparatuses.

More specifically, the present invention provides a paging system, comprising: a paging system control terminal for preparing a page message, including at least one dictionary associating one or more words with a corresponding compressed code; a device for separating words of a page message; a device for comparing each word of the page message with the one or more words in the at least one dictionary; and a device, responsive to a match between the each word of the page message and the one or more words in the at least one dictionary, for reformatting the page message using a compressed code corresponding to the matched word of the page message; a transmitter for transmitting the reformatted page message; and a page receiver, including at least one dictionary similar to the at least one dictionary of the paging system control terminal; a device, responsive to each compressed code in the reformatted page message, for retrieving a word corresponding to each compressed code from the at least one dictionary; and a device for displaying each of the retrieved words.

The present invention also provides a method for encoding and decoding a page message in a paging system comprising the steps of: separating the page message into a plurality of words; encoding at least one of the plurality of words into a preselected compressed code using at least one encoding dictionary; transmitting an encoded page message, including the compressed code corresponding to the at least one of the plurality of words; receiving the encoded page message; and decoding each encoded word of the encoded page message using at least one decoding dictionary.

BRIEF DESCRIPTION OF THE DRAWINGS

The accompanying drawings which are incorporated in, and constitute a part of the specification, illustrate presently-preferred embodiments and methods of the invention and, together with the general description given above and the detailed description of the preferred embodiments and methods given below, serve to explain the principles of the invention.

Of the Drawings:

FIG. 2 is a diagram of an ASCII code representation of an exemplary page message;

FIG. 4 is a chart diagram of header codes and descriptions according to one embodiment of the present invention;

DESCRIPTION OF A PREFERRED EMBODIMENT OF THE INVENTION

Figure 3:
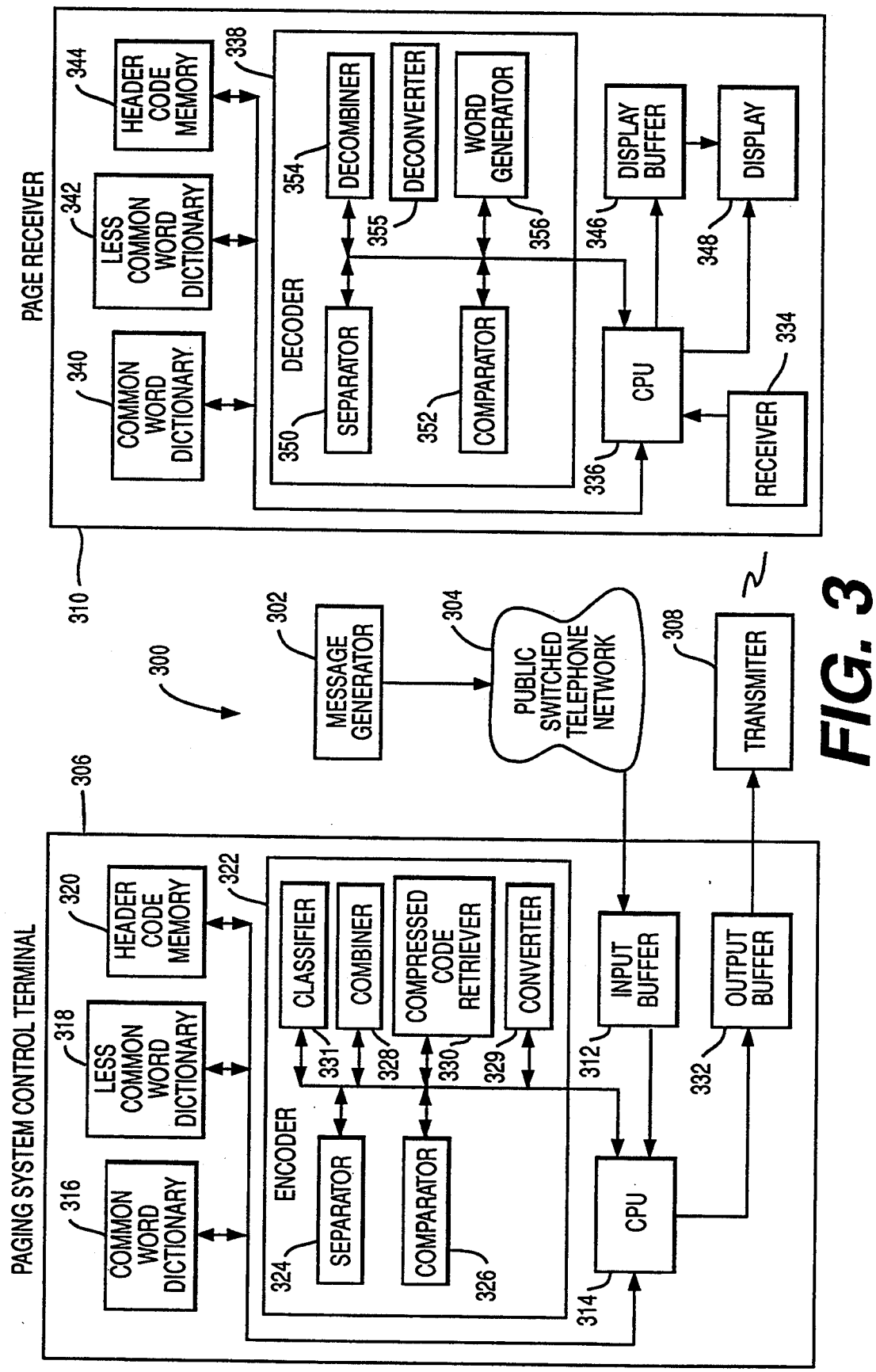
FIG. 3 is a block diagram of a paging system in accordance with one embodiment of the present invention.

FIG. 3 illustrates a block diagram of one embodiment of a paging system 300 according to the present invention. Paging system 300 includes message generator 302, public switched telephone network 304, paging system control terminal 306, transmitter 308, and page receiver 310.

A caller wishing to page a subscriber generates a message for the subscriber on message generator 302, which may comprise, for example, a conventional telephone or computer. Public switched telephone network 304 transfers the page message from message generator 302 to paging system control terminal 306.

Paging system control terminal 306 provides a centralized location for monitoring and controlling data flow, and for providing administrative, accounting and billing functions for the paging system and, therefore, includes the necessary peripheral devices (not shown) to support these functions. For example, paging system control terminal 306 may include an operator terminal, disc and/or tape drives, a modem, and a printer. An example of a preferable paging system control terminal is the National Paging Controller Computer (NPCC) owned and operated by SKYTEL in Washington, D.C., and described in part in U.S. patent application No. 07/702,121, filed May 16, 1991, which is a continuation of U.S. patent application No. 07/400,679, filed Aug. 30, 1989.

Paging system control terminal 306 prepares the page message in accordance with the TNPP protocol and provides the page message to transmitter 308, which, in turn, configures the page message into a protocol suitable for transmission to page receiver 310. Although not illustrated in FIG. 3, transmitter 308 may instead transmit the page message to a satellite which relays the page message to one or more ground stations, which, in turn, retransmit the page message to one or more appropriate geographic areas.

In a preferred embodiment of the invention, paging system control terminal 306 comprises input buffer 312, CPU 314, common word dictionary 316, less common word dictionary 318, header code memory 320, encoder 322, and output buffer 332, interconnected as shown, for example, in FIG. 3.

Also in a preferred embodiment of the invention, encoder 322 comprises separator 324, comparator 326, combiner 328, converter 329, compressed code retriever 330, and classifier 331. Encoder 322 is preferably implemented as a software application executing software routines under the control of CPU 314.

Common word dictionary 316 and less common word dictionary 318 each store a plurality of words taken from a selected language, as well as a corresponding compressed code. As used herein the term "word" includes words, terms, phrases, numbers, or characters. A compressed code is a series of bits associated with a particular word, and preferably includes a significantly smaller number of bits than the conventional ASCII representation of the word.

Common word dictionary 316 preferably contains a selection of certain words used in page messages more often than other words. In a preferred embodiment, common word dictionary 316 includes 512 preselected common words, as well as the compressed codes corresponding to each of these words. Examples of such words may include the word "at" or the phrase "please call."

There are, of course, numerous other words which are less commonly used in page messages, but which if encoded, would significantly reduce the amount of data transmitted for a page message. Examples of such words may include the term "invoice." Such words are preferably stored in less common word dictionary 318, along with their corresponding compressed codes. In a preferred embodiment, less common word dictionary 318 comprises a 64k dictionary. As will become more apparent, using two separate dictionaries permits the efficient encoding of page messages, because commonly used page message words are found in the smaller common word dictionary 316; hence, requiring less data for transmission.

Both common word dictionary 316 and less common word dictionary 318 preferably operate as lookup tables. The compressed code represents an index into the respective dictionary. For example, if common word dictionary 316 is a 512 word dictionary, each compressed code corresponding to each word in common word dictionary 316 would include nine (9) bits. Each bit pattern corresponds to a predetermined address in the dictionary. For less common word dictionary 318, which is preferably a much larger dictionary, the bit string would be correspondingly longer. For example, if less common word dictionary 318 comprises a 64k word dictionary, the bit pattern for the corresponding compressed codes would be sixteen (16) bits in length.

In a preferred embodiment of the invention, header code memory 320 stores a plurality of header codes. A header code is one or more bits identifying either which dictionary contains a word in the page message or (as explained below) a class to which the word belongs. For example, as shown in FIG. 4, a binary "0" header code may correspond to common word dictionary 316, and a binary "1" header code may correspond to less common word dictionary 318.

In accordance with one embodiment of the present invention, words not found in either common word dictionary 316 or less common word dictionary 318 are defined or classified as either a "literal" word, an "integer," a "7-digit telephone number," or a "10-digit telephone number." Thus, as shown for example in FIG. 4, in one embodiment of the present invention, four (4) three (3)-bit header codes are used to classify words not found in either dictionary, but which belong to one of the foregoing four (4) classes.

Attached as a prefix to the header code (not shown in FIG. 4) is a prefix code to distinguish whether the word in the page message is found in either of the two dictionaries 316 and 318 or the word is a classified word. In a preferred embodiment, a binary "0" indicates that the corresponding word is indexed in one of the dictionaries 316 and 318, and a binary "1" indicates that the corresponding word is a classified word.

It will be apparent to one of ordinary skill in the art that header codes, different from those shown in FIG. 4, may be selected. For example, a three (3)-bit header code may also be used to identify either of dictionaries 316 and 318 in accordance with the present invention. In that embodiment, it would not be necessary to attach a binary bit prefix code to the header code to distinguish whether the corresponding word is a word found in either dictionary or a classified word.

The operation of paging system control terminal 306 for encoding a page message in accordance with one embodiment of the present invention, will now be explained in conjunction with a preferred processing routine illustrated in FIGS. 5A and 5B.

Figure 5A:
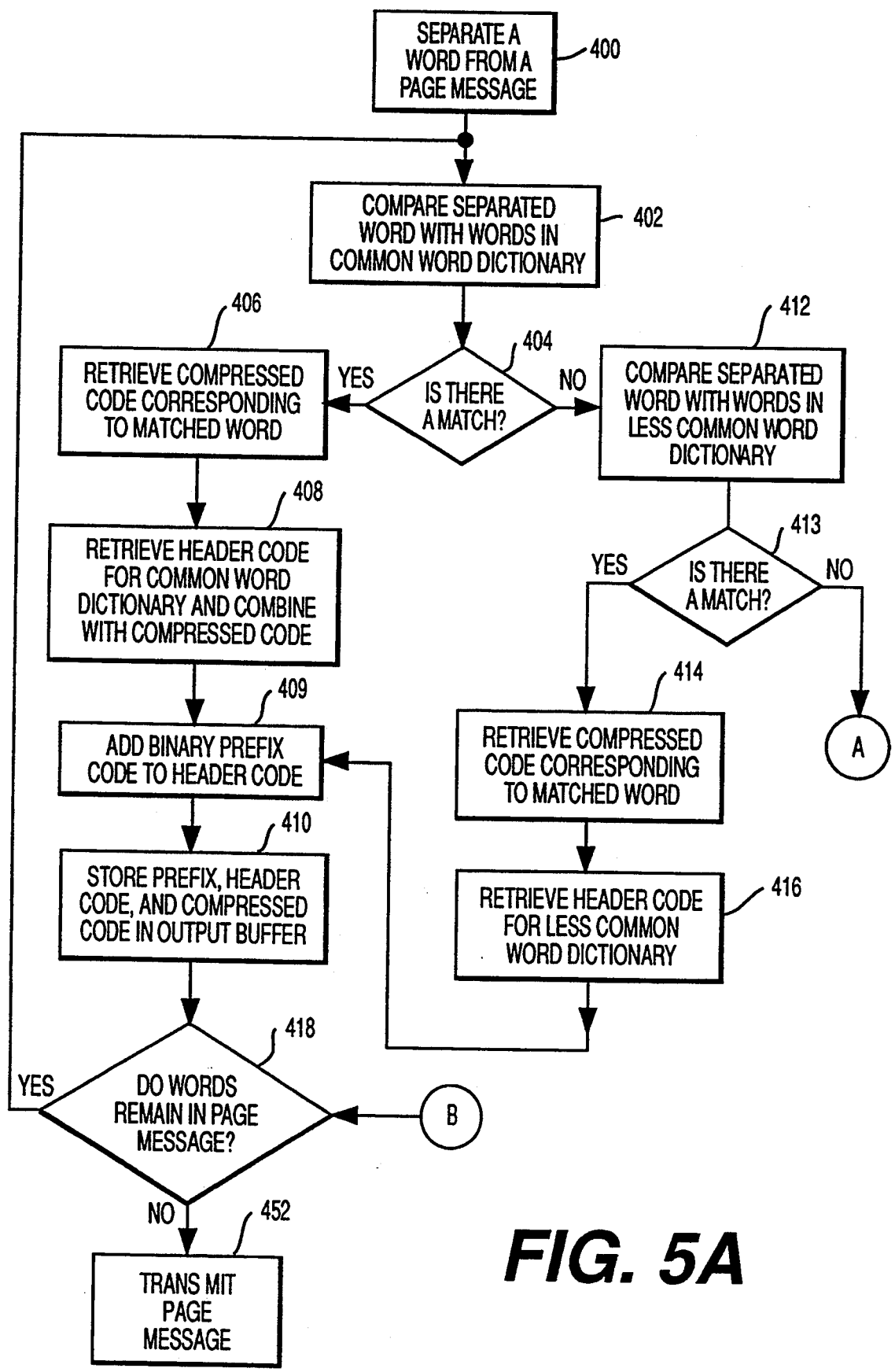
FIGS. 5A and 5B are flow diagrams illustrating a processing technique for encoding a page message in accordance with one embodiment of the present invention.

Referring to FIG. 5A, after a page message has been received by input buffer 312, it is sent, under the control of CPU 314, to separator 324 of encoder 322, which separates each word from the others in the page message, preferably by retrieving the bits between space characters (step 400). Space characters are typically identified by, for example, a predetermined hexidecimal value. The separated word is then transferred to comparator 326 which compares the separated word with each word in common word dictionary 316 (step 402). If in step 404 it is determined that a match is found, compressed code retriever 330 retrieves the compressed code corresponding to the matched word from the common word dictionary 316 (step 406), and transfers the compressed code to combiner 328.

Figure 1:
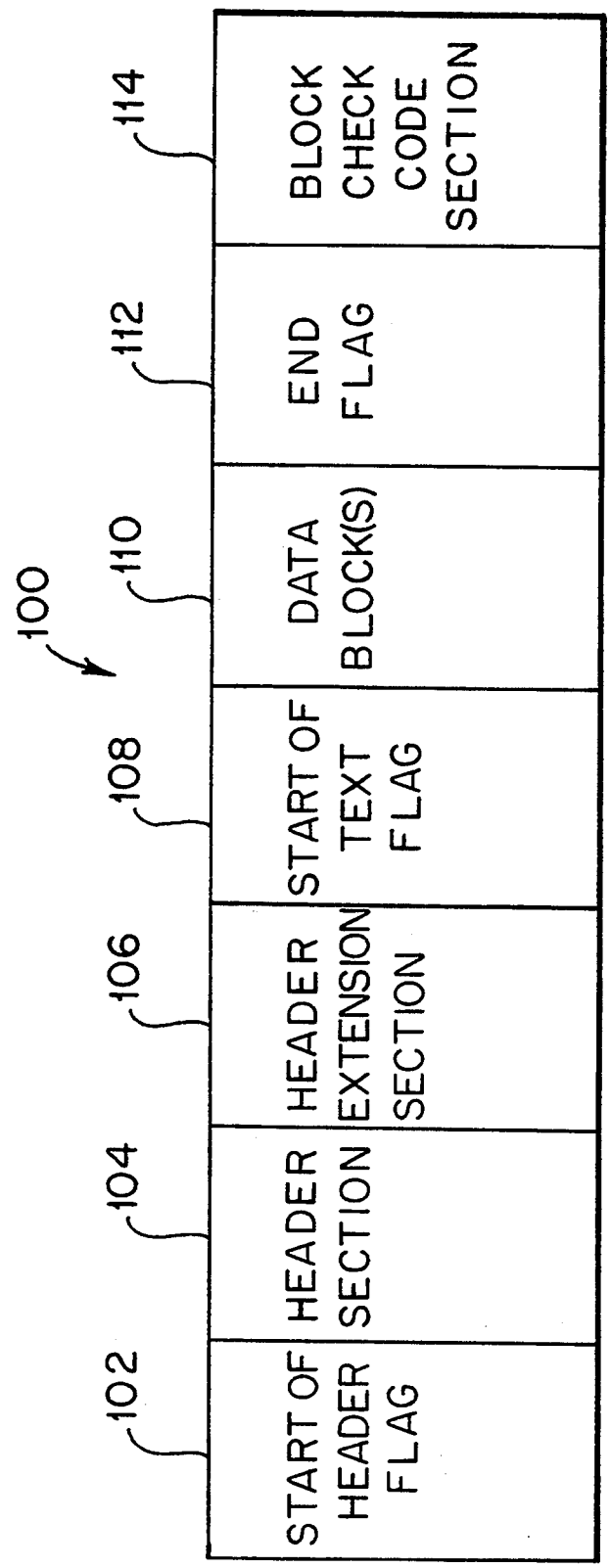
FIG. 1 is a block representation of a conventional TNPP protocol.

Classifier 331 then retrieves the header code corresponding to common word dictionary 316 from header code memory 320 and transfers it to combiner 328 where it is combined with the compressed code for the matched word (step 408). Combiner 328 adds a binary bit prefix code to the header code to indicate that the corresponding word is found in one of the two dictionaries (step 409). The prefix code, header code, and compressed code are stored in output buffer 332 in the data block or blocks 110 of the TNPP protocol (see FIG. 1).

After storing a prefix code, header code, and corresponding compressed code for a word in output buffer 332, the processing operation of encoder 332 determines if any words remain in the page message (step 418). If no words remain, processing is complete, and the page message is output from output buffer 332 to transmitter 308 where it is transmitted to page receiver 310 in accordance with conventional techniques. If, however, it is determined that additional words remain in the page message, the processing routine returns to step 402.

If in step 404 it is determined that there is no match between the separated word from the page message and the words in common word dictionary 316, the separated word is compared with the words in less common word dictionary 318 by comparator 326 (step 412). If a match is found, compressed code retriever 330 retrieves the corresponding compressed code from less common word dictionary 318 (step 414), and classifier 331 retrieves the header code corresponding to less common word dictionary 318 from header code memory 320 (step 416). Combiner 328 then adds a binary bit prefix code to the retrieved header code to indicate that the corresponding word is found in one of the two dictionaries (step 409). Combiner 328 then combines the prefix code and retrieved header code with the compressed code, and stores these codes in output buffer 332 (step 410).

If, in step 413, it is determined that there is no match between the separated word and the words in less common word dictionary 318, as discussed above, the word is classified as either a literal word, a seven (7)-digit telephone number, a ten (10)-digit telephone number or an integer.

Figure 5B:
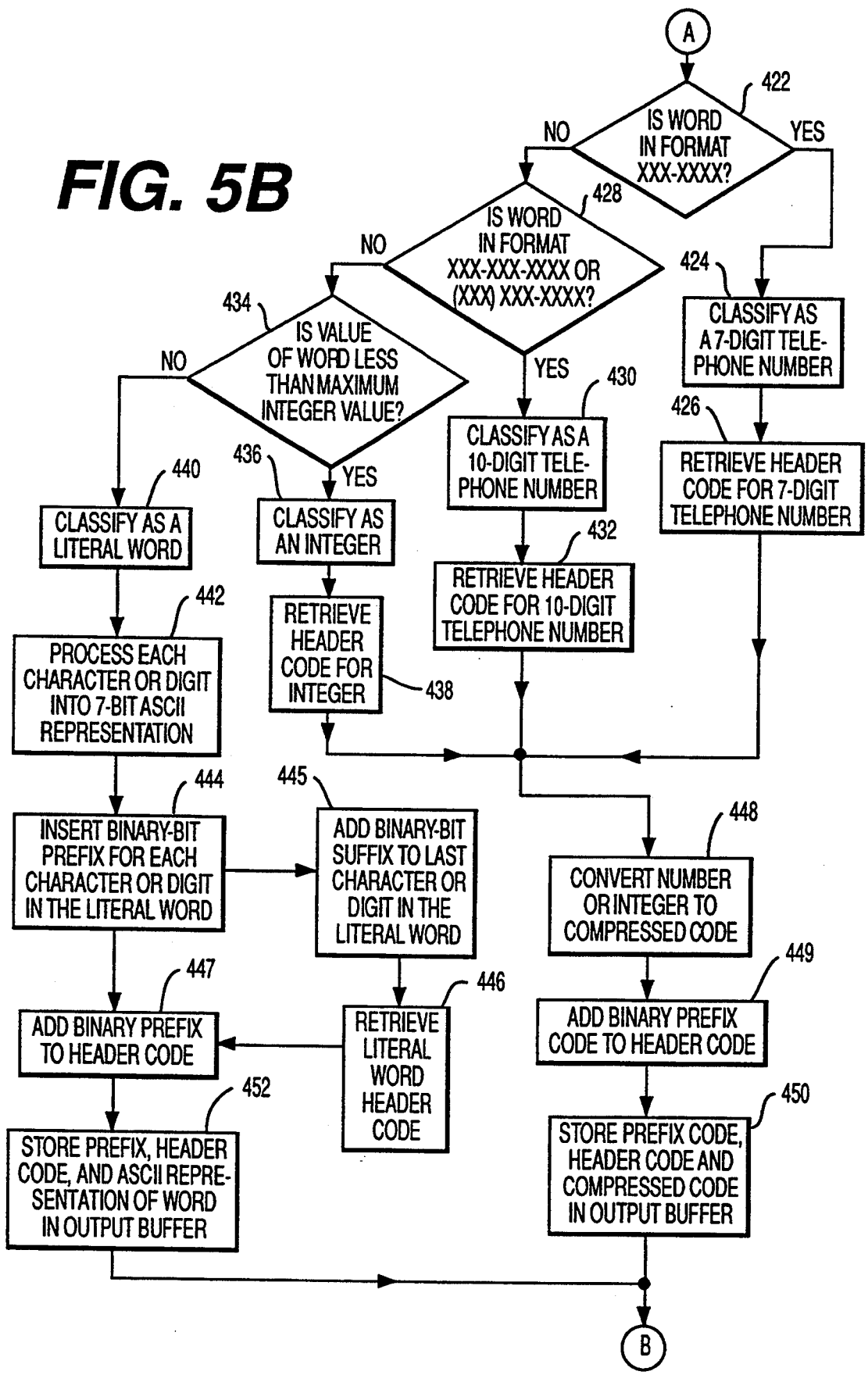

As shown in FIG. 5B, after step 413, comparator 326 determines if the word is in the format, XXX-XXXX (where "X" represents a digit) (step 422). Because each word is input to the encoder in its ASCII representation, comparator 326 compares the format of the eight (8)-bit ASCII representation of the word with a predetermined eight (8)-bit ASCII representation of the format XXX-XXXX. If in step 422 it is determined that the word is in the format XXX-XXXX, then classifier 331 classifies the word as a seven (7)-digit telephone number (step 424), and retrieves the corresponding header code from header code memory 320 (step 426).

If in step 422 it is determined that the word is not a seven (7)-digit telephone number, then comparator 326 determines if the word is in the format XXX-XXX-XXXX (step 428), in a manner similar to that for the seven (7)-digit telephone number. If, in step 428, it is determined that the word is a ten (10)-digit telephone number, classifier 331 classifies the word as a ten (10)-digit telephone number (step 430), and retrieves the corresponding header code from header code memory 320 (step 432).

If the word is neither a seven (7)-digit telephone number nor a ten (10)-digit telephone number then comparator 326 compares the value of the word with a maximum integer value to determine whether or not the word can be classified as an integer (step 434). In a preferred embodiment the maximum integer value is selected to be 65,536. This value represents a value below which fall most integers used in page messages. If, in step 434, it is determined that the value of the word is less than the value of the maximum integer value, then classifier 331 classifies the word as an integer (step 436), and retrieves the corresponding header code from header code memory 320 (step 438). If, however, the word is greater than the value of the maximum integer value, then classifier 331 classifies the word as a literal word (step 440).

In a preferred embodiment of the invention, words classified as literal words are processed by converter 329 into their ASCII representation. Each character of a literal word (or each digit of a number greater than the value of the maximum integer value) is processed into its corresponding seven (7)-bit ASCII representation (step 442). As illustrated below, in a preferred embodiment, converter 329 adds a binary bit prefix to each seven (7)-bit ASCII representation of each character of a word or digit of a number to indicate that the following seven (7)-bits are part of the bit string being processed as a literal word (step 444). As further illustrated below, converter 329 also adds a binary bit suffix to the end of the seven (7)-bits of the last character or digit in the literal word to indicate that there are no more characters or digits in the literal word (step 445).

Classifier 331 then retrieves the corresponding header code for literal words from header code memory 320 (step 446), and combiner 328 adds a binary bit prefix code to the header code to indicate that the word is a classified word (rather than a word found in one of the two dictionaries) (step 447). The prefix code, header code, and ASCII representation of the literal word are then stored in output buffer 332 (step 452).

If the word comprises either a seven (7)-digit telephone number, a ten (10)-digit telephone number, or an integer less than the maximum integer value, converter 329 converts the telephone number or integer to a compressed number code (step 448). This conversion is preferably accomplished using a conventional ASCII-to-unsigned-integer conversion. For example, in ASCII, the word "100" would be transmitted as three (3) numbers, one (1), zero (0), and zero (0) thus requiring that three (3) eight (8)-bit representations, twenty-four (24) total bits, be transmitted. However, in the ASCII-to-unsigned-integer conversion technique, the word "100" is transmitted as the unsigned integer one hundred (100), which can be represented using one (1) seven (7)-bit code. However, through experimentation, it has been found that the preferable integer code length is sixteen (16) bits. This permits data compression for a greater number of integer values (in this preferred embodiment 65,536 integer values), even though this technique is somewhat less efficient for integer values less than or equal to ninety-nine (99). Therefore, transmitting telephone numbers and integers as unsigned integers reduces the amount of transmitted data. As shown in FIG. 4, in one embodiment, the compressed code for an integer is preferably sixteen (16) bits in length, the compressed code for a seven (7)-digit telephone number is preferably twenty-four (24) bits in length, and the compressed code for a ten (10)-digit telephone number is preferably thirty-four (34) bits in length.

In accordance with the present invention, suitable conversion techniques other than the ASCII-to-unsigned-integer technique can be used to compress seven (7)- and ten (10)-digit telephone numbers and integers having values less than a predetermined maximum.

After the foregoing conversion in step 448, combiner 328 adds a binary-bit prefix code to the corresponding header code (step 449) and stores the prefix code, header code, and corresponding compressed code in output buffer 332. The encoder processing routine then returns to step 418 to determine if any words remain in the page message. If so, the processing routine returns to step 402. If no words remain in the page message, the page message is transmitted in accordance with conventional techniques (step 452). As will be understood by those of ordinary skill in the art, to ensure that any eight (8)-bit ASCII words contained in the data block do not conflict with any reserved codes corresponding, for example, to any of the flag or section codes in the TNPP protocol (see FIG. 1), these ASCII words are converted from eight (8) bits to six (6) bits by a converter (not shown), in accordance with conventional techniques.

Figure 6:
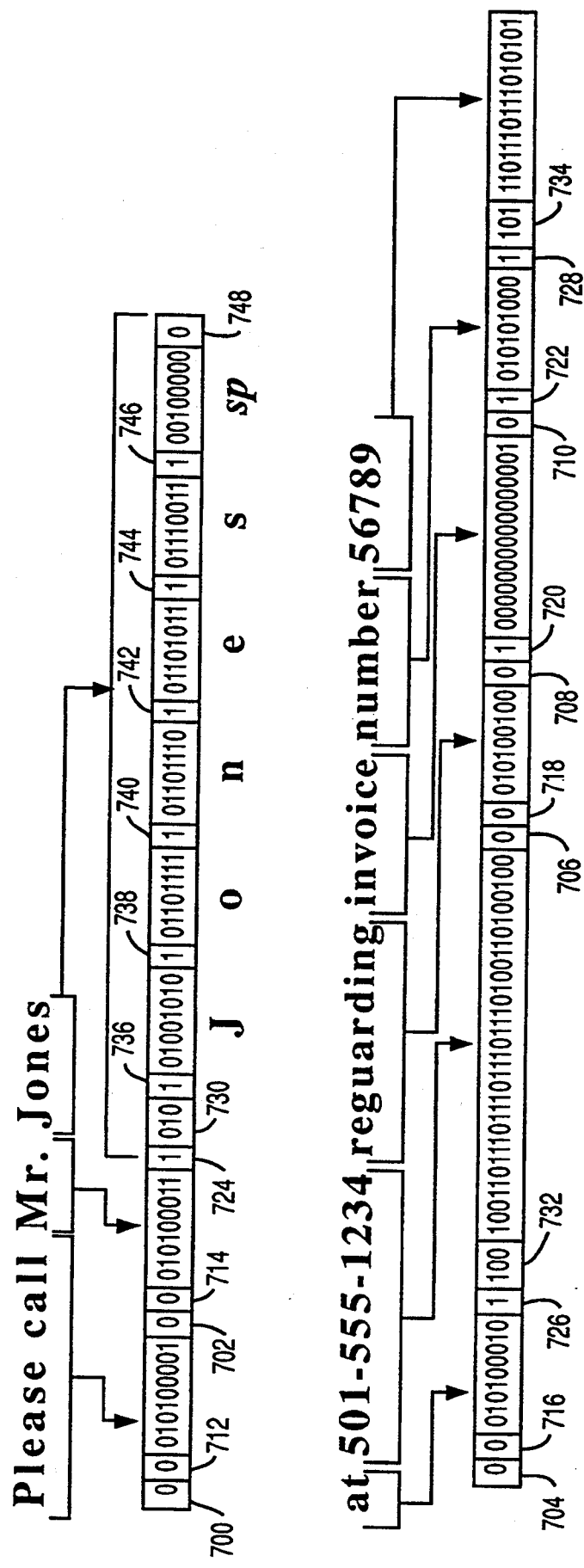
FIG. 6 is a diagram of an exemplary page message encoded in accordance with one embodiment of the present invention.

To help illustrate the foregoing encoding and compression technique, FIG. 6 illustrates a data block 110 (see FIG. 1) containing the exemplary paging message, "Please call Mr. Jones at 501-555-1234 regarding invoice number 56789," compressed in accordance with the foregoing encoding and compression techniques. In this example, the phrase "Please call" and the words "Mr.," "at," "regarding," and "number" are words and phrases stored in common word dictionary 316; the term "invoice" is stored in less common word dictionary 318; the telephone number "501-555-1234" is classified as a ten (10)-digit telephone number, the number "56789" is classified as an integer; and the word "Jones" is classified as a literal word.

As seen from FIG. 6, the first bit of each encoded word is the prefix code, which indicates whether that encoded word is found in one of the dictionaries or is a classified word. For example, the binary bit "0" prefix codes indicated by reference numerals 700, 702, 704, 706, 708, and 710, indicate that the corresponding bit string is a word found in one of the dictionaries. The binary bit immediately following each of these prefix codes indicates to which of the two dictionaries the encoded word corresponds. For example, binary bits "0" identified by reference numeral 712, 714, 716, 718, and 722 indicate that the corresponding encoded words are located in common word dictionary 316, while the binary bit "1" identified by reference numeral 720 indicates that the corresponding encoded word is found in less common word dictionary 318.

The binary bit "1" prefix codes indicated by reference numerals 724, 726, and 728 indicate that the corresponding encoded words are classified words, and not words found in either of dictionaries 316 or 318. Accordingly, a three (3)-digit header code (reference numerals 730, 732, and 734) is associated with each prefix code 724, 726, and 728.

With reference to FIG. 4, header code "010," 730 indicates that the corresponding encoded word or corresponding bit string is a literal word; the header code "100" 732 indicates that the corresponding encoded word (34-bits) is a ten (10)-digit telephone number; and the header code "101" 734 indicates that the corresponding encoded word (16-bits) is an integer. With respect to the literal word "Jones," the binary "1" prefix attached to each seven (7)-bit ASCII representation of each character of the name "Jones" (reference numerals 736, 738, 740, 742, 744, and 746) indicates that the following seven (7) bits are part of the literal word "Jones." The binary bit "0" 748 at the end of the space character indicates the end of the bit string for the literal word "Jones."

As can be seen by comparison of the data strings of FIG. 2 and FIG. 6, the compression technique of the present invention significantly reduces the amount of data to be transmitted. The exemplary message converted to ASCII representation in accordance with conventional techniques requires 544 binary bits (see FIG. 2), whereas the same message compressed in accordance with the compression and encoding techniques of the present invention requires only 191 binary bits.

FIG. 3 also illustrates a preferred block diagram of a page receiver capable of decoding a page message encoded in accordance with the encoding techniques of the present invention. Page receiver 310 includes receiver 334, CPU 336, decoder 338, common word dictionary 340, less common word dictionary 342, header code memory 344, display buffer 346, and display 348, interconnected as shown. Decoder 338 preferably includes separator 350, comparator 352, decombiner 354, deconverter 355, and word generator 356. Decoder 338 is preferably implemented as a software application executing software routines under the control of CPU 336.

Common word dictionary 340 and less common word dictionary 342 are preferably identical to common word dictionary 316 and less common word dictionary 318 in the paging system control terminal 306, respectively, and contain the same words and compressed codes in each respective dictionary.

Figure 7:
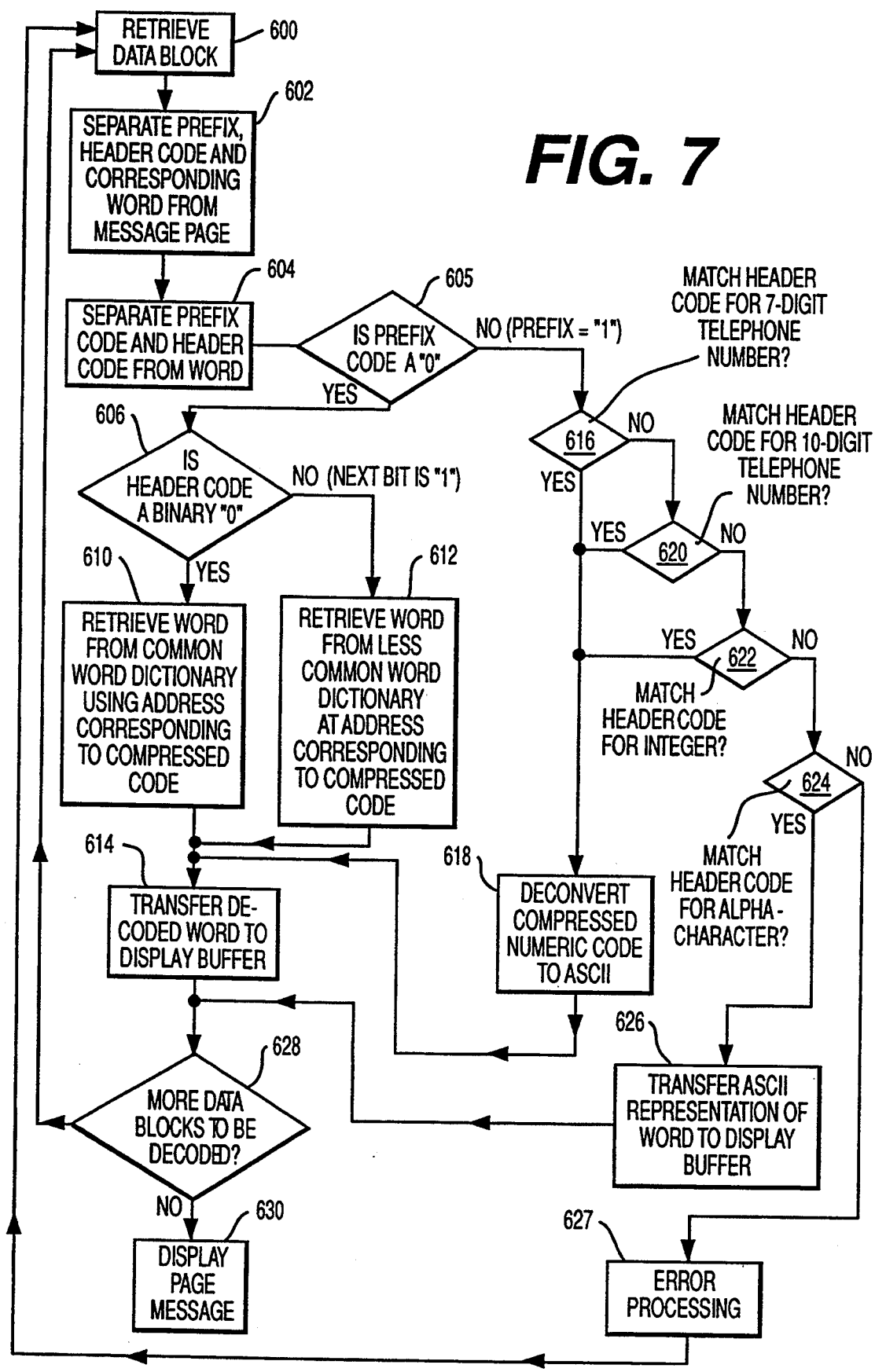
FIG. 7 is a flow diagram illustrating a processing technique for decoding a page message in accordance with one embodiment of the present invention.

FIG. 7 illustrates a preferred processing technique for decoding an encoded message received by page receiver 310. Initially, a data block or blocks 110 (see FIG. 1) is retrieved from the encoded page message and transferred to separator 350 (step 600). Separator 350 separates each prefix code, header code, and corresponding encoded word from others in the encoded message and transfers them to decombiner 354 (step 602). Decombiner 354 then separates the prefix code and header code from the corresponding encoded word (step 604) and transfers them to comparator 354. Comparator 352 first determines whether the prefix code is a binary "0" (step 605). If it is, the corresponding encoded word is a word contained in one of dictionaries 340 or 342. Therefore, comparator 352 examines the corresponding header code to determine in which dictionary the encoded word is stored. In particular, comparator 352 determines whether the header code bit is a binary "0" (step 606). If it is, then word generator 356 uses the compressed code corresponding to the encoded word and retrieves the corresponding decompressed word from common word dictionary 340 at the address represented by the compressed code (step 610). If, in step 606, it is determined that the header code bit is not a binary "0," it will be a binary "1," in which case word generator 356 retrieves the decompressed word from less common word dictionary 342 at the address represented by the compressed code (step 612).

If, in step 605, it is determined that the prefix code is not a binary "0," it will be a binary "1," in which case the header code of the encoded word will not correspond to one of the common or less common word dictionaries. Therefore, comparator 352 compares the corresponding header code with those header codes stored in header code memory 344 to determine the classification of the encoded word. In a preferred embodiment, header code memory 344 stores the same four (4) three (3)-digit header codes as header code memory 320 in paging system control terminal 306 (see FIG. 4).

Initially, comparator 352 compares the header code with that header code identifying the seven (7)-digit telephone number classification to determine if there is a match (step 616). If there is a match, then the corresponding encoded word comprises a twenty-four (24)-bit compressed numeric code corresponding to a seven (7)-digit telephone number. This compressed numeric code is deconverted by deconverter 355, preferably to an ASCII representation using a conventional unsigned integer to ASCII conversion technique (step 618). The ASCII representation is then stored in display buffer 346 (step 614).

If, in step 616, the header code does not match the seven (7)-digit telephone number header code, it is compared with the header code representing ten (10)-digit telephone numbers to determine if there is a match (step 620). If there is a match, then the corresponding encoded word comprises thirty-four (34) bits of compressed numeric code corresponding to a ten (10)-digit telephone number. This compressed numeric code is also deconverted by deconverter 355, preferably to an ASCII representation using the unsigned integer to ASCII technique (step 618). The ASCII representation is then stored in display buffer 346 (step 614).

If the header code does not match the ten (10)-digit telephone number header code, then it is compared with the header code representing an integer to determine if there is a match (step 622). If there is a match, then the corresponding encoded word comprises sixteen (16) bits of compressed numeric code corresponding to an integer. This compressed numeric code is also deconverted by deconverter 355, preferably to an ASCII representation using the unsigned integer to ASCII conversion technique (step 618). The ASCII representation is then stored in display buffer 346 (step 614).

Finally, if a match with the integer header code is not found, then the header code is compared to the header code representing the literal word classification to determine if there is a match (step 624). If there is a match, then the corresponding encoded word will comprise the ASCII representation of the word, including binary prefixes "1" between seven (7)-digit codes to identify which bits belong to the literal word and the binary suffix "0" to indicate the end of the literal word. This ASCII representation of the word is transferred to display buffer 346 (step 626).

If in step 624 it is determined that the header code does not match the header code for the literal word classification, the processing technique performs error processing (step 627), which does not constitute part of this invention, and returns to step 600.

After each decompressed word is stored in display buffer 346, decoder 338 determines whether additional information remains in the data block to be processed (step 628). If additional information remains, decoder processing of the compressed page message continues with step 600. If not, the decompressed page message stored in display buffer 346 is displayed on display 348 (step 630).

Figure 8A:
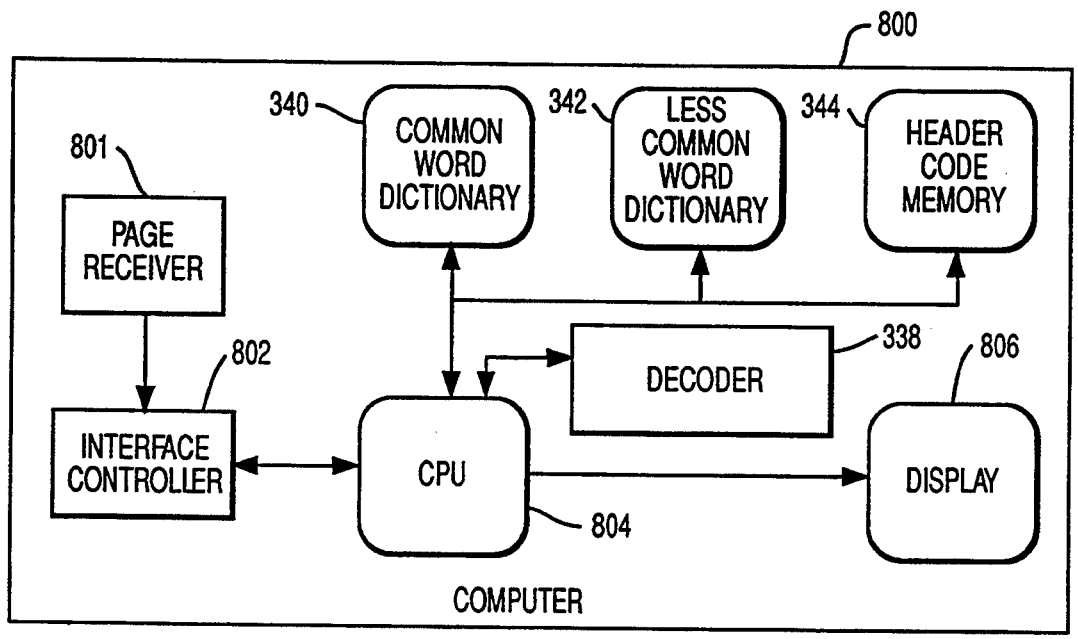
FIGS. 8A and 8B are block diagrams of page receiver/computer devices in accordance with alternative embodiments of the present invention.

FIG. 3 shows one embodiment of the present invention wherein decoder 338 is provided within page receiver 310. In an alternative embodiment, a page receiver may be placed within, and integrally connected to, a computer. In this embodiment, as shown in FIG. 8A, decoder 338, common word dictionary 340, less common word dictionary 342, and header code memory 344 are contained in computer 800 for decompressing page messages under the control of the computer's CPU 804, in accordance with the foregoing decompressing and decoding techniques. In this embodiment, page receiver 801 comprises any conventional page receiver capable of receiving and storing an alphanumeric page message such as the exemplary message: "Please call Mr. Jones at 501-555-1234 regarding invoice number 56789." Interface controller 802 may be included to control the transfer of the compressed data stream to computer CPU 804. In this embodiment, decompressed display messages are displayed on computer display 806.

Figure 8B:
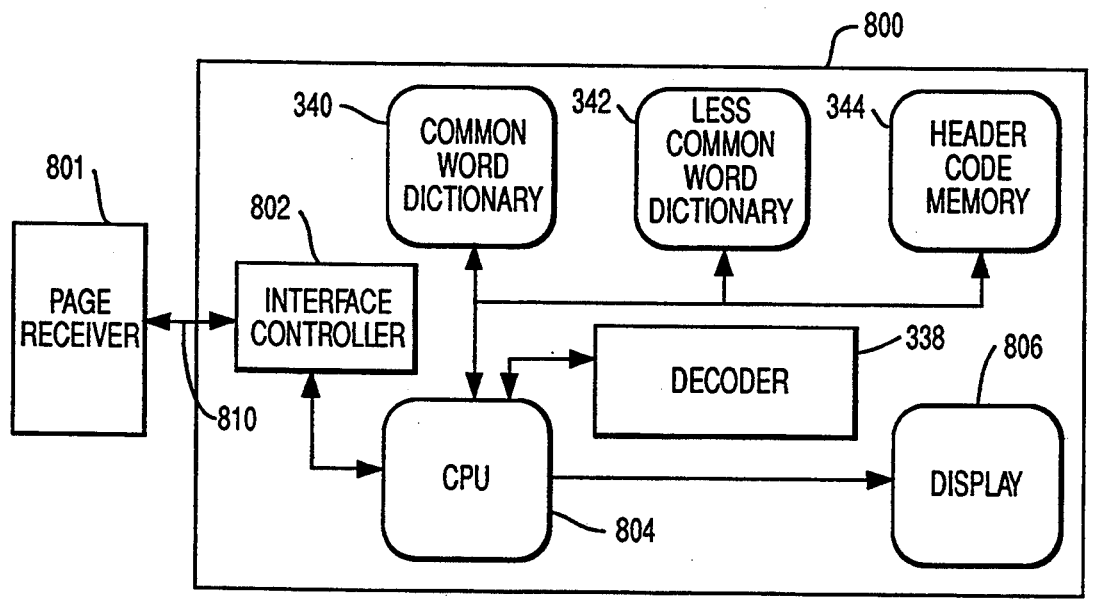

Alternatively, as shown in FIG. 8B, a page receiver 801 may be externally coupled to a computer via an external coupling 810. Coupling 810 may comprise any type of electrical connection necessary to transfer information between interface ports of the page receiver and the computer (not shown), including, for example, a cable connection or a slot/pin connection.

In an alternative embodiment, common word dictionary 340, less common word dictionary 342, header code memory 344, and decoder 338 may be provided within the page receiver, (as shown in FIG. 3) which is externally coupled to a computer so that the decompressed page messages may be processed and displayed on the computer display.

Additional advantages and modifications will readily occur to those skilled in the art. Therefore, the invention in its broader aspects, is not limited to the specific details, representative devices and illustrative examples shown and described herein. For example, other types of information transmitted in page messages, for example punctuation marks, may be encoded in accordance with the foregoing techniques. In such a case, additional header codes may be added to identify and encode punctuation marks, which may be further encoded in accordance with any desired encoding technique. Accordingly, departures may be made from the details of this application without departing from the spirit or scope of the general inventive concept as defined by the appended claims and their equivalents.

What is claimed is:

1. A paging system, comprising:
   a paging system control terminal for preparing a page message, including,
   a first encoding dictionary containing a first plurality of selected words;
   a second encoding dictionary containing a second plurality of selected words different from said first plurality of selected words contained in said first encoding dictionary, said second plurality of words being larger than said first plurality of words;
   means for separating words of said page message;
   means for comparing each word of said page message with said one or more words in said first and second dictionaries;
   means, responsive to a match between said each word of said page message and said one or more words in said first and second dictionaries, for reformatting said page message using a compressed code corresponding to each said matched word of said page message; and
   means for combining a selected header code identifying either said first or second dictionary and the compressed code corresponding to each matched word of the page message;
   a transmitter for transmitting said reformatted page message; and
   a page receiver, including,
      first and second dictionaries similar to said first and second dictionaries of said paging system control terminal;
      means, responsive to each compressed code in said reformatted page message, for retrieving a corresponding word from one of said first and second dictionaries; and
      means for displaying each of said retrieved words.

2. A paging system for transmitting and receiving a series of bits that correspond to a selected message, the message including a plurality of words, the paging system comprising:
   means for separating the selected page message into the plurality of words;
   means, including at least one encoding dictionary, for encoding at least one of said plurality of words into a preselected compressed code;
   means for transmitting an encoded message, including the compressed code corresponding to said at least one of said plurality of words;
   means for receiving said encoded message;
   means, including at least one decoding dictionary, for decoding each encoded word of the encoded message; wherein, said encoding means includes:
   means for comparing each word of said message with said plurality of words in said at least one encoding dictionary; and
   means, responsive to said comparing means, for combining a selected header code identifying said encoding dictionary and said compressed code.

3. The paging system according to claim 2 further comprising means for classifying each word other than said at least one of said plurality of words of said page message, and means for associating with each classified word a header code identifying the classification of said word.

4. The paging system according to claim 3, wherein said classifying means includes means for recognizing a predetermined series of bits representing a telephone number; and
   means for encoding said predetermined series of bits into a smaller number of bits and combining said header code with said smaller number of bits.

5. The paging system according to claim 3, wherein said classifying means includes means for recognizing a predetermined series of bits representing an integer; and
   means for encoding said predetermined series of bits into a smaller number of bits and combining said header code with said smaller number of bits.

6. The paging system according to claim 3, wherein said classifying means includes means for recognizing a predetermined series of bits representing a literal alpha-character word; and
   means for encoding said predetermined series of bits into a smaller number of bits and combining said header code with said smaller number of bits.

7. The paging system according to claim 2, wherein said decoding means includes means, responsive to each of said header codes for decoding encoded words in accordance with different techniques depending upon the associated header code.

8. A paging system for transmitting and receiving a series of bits that correspond to a selected message, the message including a plurality of words, the paging system comprising:
   means for separating the selected page message into the plurality of words;
   means for encoding at least one of said plurality of words into a preselected compressed code;
   means for transmitting an encoded message, including the compressed code corresponding to said at least one of said plurality of words;
   means for receiving said encoded message;
   means, including at least one decoding dictionary, for decoding each encoded word of the encoded message; wherein said means for encoding includes:
   a first encoding dictionary containing a first plurality of selected words; and
   a second encoding dictionary containing a second plurality of selected words different from said first plurality of selected words contained in said first encoding dictionary, said second plurality of words being larger than said first plurality of words.

9. A paging system for transmitting and receiving a series of bits that correspond to a selected message, the message including a plurality of words, the paging system comprising:
  means for separating the selected page message into the plurality of words;
  means, including at least one encoding dictionary, for encoding at least one of said plurality of words into a preselected compressed code;
  means for transmitting an encoded message, including the compressed code corresponding to said at least one of said plurality of words;
  means for receiving said encoded message;
  means, including at least one decoding dictionary, for decoding each encoded word of the encoded message; wherein said means for encoding includes:
  means for combining a first header code with each of said preselected compressed codes to indicate that said compressed codes are stored in said at least one encoding dictionary;
  means for classifying each word of said page message other than said at least one of said plurality of words, and
  means for combining a second header code with a code for each of said words of said page message other than said at least one of said plurality of words to identify their classification.

10. In a paging system including a paging system control terminal and a page receiver, a paging method for encoding and decoding a page message, the method comprising the steps of:
  storing in said paging system control terminal at least one dictionary associating one or more words with corresponding compressed codes;
  separating words of a page message;
  comparing each word of said page message with said one or more words in said at least one dictionary;
  reformatting said page message using a compressed code and a header code identifying said at least one dictionary, said compressed code corresponding to a matched word of said page message when said comparing step determines that there is a match between a word of said page message and said one or more words in said at least one dictionary;
  transmitting said reformatted page message; and
  storing in a page receiver at least one dictionary similar to said at least one dictionary of said paging system control terminal;
  retrieving a word from said at least one dictionary in said page receiver corresponding to each compressed code in said reformatted page message; and
  displaying each of said retrieved words.

11. In a paging system for transmitting a series of bits that correspond to a page message, said page message including a plurality of words, a method for encoding said page message comprising the steps of:
  separating said page message into the plurality of words;
  encoding at least one of said plurality of words into a preselected compressed coding using two or more different encoding dictionaries; and
  transmitting an encoded page message, including the compressed code corresponding to said at least one of said plurality of words and a header code identifying one of said two or more different dictionaries.

12. A paging method according to claim 11, further comprising the steps of:
  classifying each word of said page message other than said at least one of said plurality of words, and
  associating with each classified word a header code identifying the classification of said word.

13. A paging method according to claim 12, wherein said step of classifying includes the step of:
  recognizing a predetermined series of bits representing a telephone number.

14. The paging method according to claim 12, wherein said step of classifying includes the step of:
  recognizing a predetermined series of bits representing an integer.

15. The paging method according to claim 12, wherein said step of classifying includes the step of:
  recognizing a predetermined series of bits representing a literal alpha-character word.

16. The paging method according to claim 11, wherein said step of decoding includes the step of:
  decoding said encoded words in accordance with different techniques depending upon an associated header code.

17. The paging method according to claim 13, further comprising the steps of encoding said predetermined series of bits into a smaller number of bits, and combining said header code with said smaller number of bits.

18. The paging method according to claim 14, further comprising the steps of encoding said predetermined series of bits into a smaller number of bits, and combining said header code with said smaller number of bits.

19. The paging method according to claim 15, further comprising the steps of encoding said predetermined series of bits into a smaller number of bits, and combining said header code with said smaller number of bits.

20. In a paging system for transmitting a series of bits that correspond to a page message, said page message including a plurality of words, a method for encoding said page message comprising the steps of:
  separating said page message into the plurality of words;
  encoding at least one of said plurality of words into a preselected compressed code using at least one encoding dictionary;
  combining a first header code with each of said preselected compressed codes to indicate that said compressed codes are stored in said at least one encoding dictionary;
  classifying each word of said page message other than said at least one of said plurality of words; and
  combining a second header code with a code for each of said words of said page message other than said at least one of said plurality of words to identify their classification.

21. The paging method according to claim 20, further comprising the step of:
  analyzing said first and second header codes;
  decoding each preselected compressed code using said at least one decoding dictionary when a header code is said first header code; and
  decoding each of said codes for said words of said page message other than said at least one of said plurality of words without using said at least one decoding dictionary when a header code is said second header code.

22. A paging system for compressing and transmitting a page message including a plurality of words, comprising:
  a first dictionary storing a first set of words and corresponding compressed codes;
  a second dictionary storing a second set of words and corresponding compressed codes;

means for comparing a word of said page message with each word in said first set of words in said first dictionary;

means for transmitting a corresponding compressed code for one of said words in said first dictionary when said word of said page message matches said one of said words in said first dictionary;

means for comparing said word of said page message with each word in said second set of words in said second dictionary when said word of said page message does not match one of said words in said first set of words in said first dictionary;

means for transmitting a corresponding compressed code for one of said words in said second dictionary when said word of said page message matches said one of said words in said second dictionary; and means for converting said word of said page message to an encoded word when said word of said page message does not match one of said words in said second set of words in said second dictionary.

23. A method of compressing and transmitting a page message including a plurality of words, comprising the steps of:

storing a first set of words and corresponding compressed codes in a first dictionary;

storing a second set of words and corresponding compressed codes in a second dictionary;

comparing a word of said page message with each word in said first set of words in said first dictionary;

transmitting a corresponding compressed code for one of said words in said first dictionary when said word of said page message matches said one of said words in said first dictionary;

comparing said word of said page message with each word in said second set of words in said second dictionary when said word of said page message does not match one of said words in said first set of words in said first dictionary;

transmitting a corresponding compressed code for one of said words in said second dictionary when said word of said page message matches said one of said words in said second dictionary; and converting said word of said page message to an encoded word when said word of said page message does not match one of said words in said second set of words in said second dictionary.

24. A method of decompressing a page message comprising the steps of:

storing a first set of words and corresponding compressed codes in a first dictionary;

storing a second set of words and corresponding compressed codes in a second dictionary;

comparing a compressed code in the page message with one or more compressed codes in said first dictionary;

displaying the corresponding word if the compressed code matches a compressed code found in the first dictionary;

comparing the compressed code to compressed codes in the second dictionary if the compressed code does not match any compressed codes in the first dictionary; and displaying a corresponding word if the compressed code matches a compressed code in the second dictionary.

* * * * *